(12) United States Patent
Zhu

(10) Patent No.: US 6,715,723 B2
(45) Date of Patent: Apr. 6, 2004

(54) CARRIER FOR ROASTER OVENS

(76) Inventor: Shanbao Zhu, Floor 22, Building 4, Jiliandasha, Lianhuabeicun, Shenzhen (CN)

(*) Notice: Subject to any disclaimer, the term of this patent is extended or adjusted under 35 U.S.C. 154(b) by 0 days.

(21) Appl. No.: 10/346,209

(22) Filed: Jan. 16, 2003

(65) Prior Publication Data

US 2003/0136886 A1 Jul. 24, 2003

(30) Foreign Application Priority Data

Jan. 21, 2002 (CN) .............................................. 2114777

(51) Int. Cl.⁷ ................................................. A47K 1/04
(52) U.S. Cl. ..................... 248/129; 248/146; 126/25 R; 126/41 R
(58) Field of Search ........................... 248/129, 95, 98, 248/146, 150, 156; 99/385, 444; 126/25 R, 41 R; D7/337, 332, 402

(56) References Cited

U.S. PATENT DOCUMENTS

| | | | | |
|---|---|---|---|---|
| 4,318,352 A | * | 3/1982 | Friedman et al. ........... | 108/107 |
| 4,627,543 A | * | 12/1986 | Nicely ......................... | 211/187 |
| 4,799,818 A | * | 1/1989 | Sudimak et al. ............. | 403/107 |
| 4,955,358 A | * | 9/1990 | Harris et al. ............... | 126/25 R |
| 4,984,515 A | * | 1/1991 | Pivonka ....................... | 99/449 |
| 5,016,607 A | * | 5/1991 | Doolittle et al. ........... | 126/25 R |
| 5,140,973 A | * | 8/1992 | Home ....................... | 126/41 R |
| D356,924 S | * | 4/1995 | Pai ............................... | D7/334 |
| D375,436 S | * | 11/1996 | Bird et al. .................... | D7/403 |
| 5,791,331 A | * | 8/1998 | Stewart ..................... | 126/41 R |
| 5,941,229 A | * | 8/1999 | Schlosser et al. ......... | 126/41 R |
| 6,062,150 A | * | 5/2000 | Sikora et al. ................ | 108/190 |
| D447,002 S | * | 8/2001 | Pai ............................... | D7/403 |
| 6,474,327 B1 | * | 11/2002 | Bossler ....................... | 126/41 R |

* cited by examiner

*Primary Examiner*—Anita King
(74) *Attorney, Agent, or Firm*—James B. Conte; Barnes & Thornburg

(57) ABSTRACT

The present invention provides a carrier for a roaster oven including a bottom frame including two shafts; two first legs each having a tubular upper end, connected to one end of the shafts; two second legs each having a tubular upper end, connected to another end of the shafts; a connecting device for supporting the roaster oven, having four sleeve pipes housing the upper end of the first and second legs; and two gridirons each including two plugs inserted into the sleeve pipes. The carrier of the invention is steady and easily assembled.

14 Claims, 2 Drawing Sheets

US 6,715,723 B2

CARRIER FOR ROASTER OVENS

FIELD OF THE INVENTION

The present invention relates to a device for supporting roaster ovens, particularly a carrier for a roaster oven that is steady and easily folded.

BACKGROUND OF THE INVENTION

The roaster oven is a cooking utensil that is popular around the world. There have been various roaster ovens disclosed in the prior art. Apparently, it is also necessary to provide a suitable carrier to support the roaster oven. Especially, it is needed to provide a carrier that is steady and easily mounted.

SUMMARY OF THE INVENTION

Therefore, an object of the present invention is to provide a carrier for a roaster oven. The carrier of the invention includes a bottom frame including two shafts; two first legs each having a tubular upper end, connected to one end of the shafts; two second legs each having a tubular upper end, connected to another end of the shafts; a connecting device for supporting the roaster oven, having four sleeve pipes housing the upper end of the first and second legs; and two gridirons each including two plugs inserted into the sleeve pipes.

In one embodiment of the invention, the upper end of the first legs and second legs has a groove extended along its length direction so that the legs, the connecting device and the gridiron can match fixedly. The bottom frame may further include at least one connecting rods perpendicular to the shafts.

In another embodiment of the present invention, the first legs and the second legs are hinged to the bottom frame so that the first and second legs can be folded with the bottom frame.

For easily moving, the carrier of the invention may include a plurality of wheels provided at the end portion of at least one of the first legs and the second legs.

In the invention, each of the gridirons may include an outer frame and a plurality of poles connected to the outer frame for placing stuffs to be roasted.

The connecting device of the invention may also include a circular support for supporting the roaster oven.

In another embodiment of the invention, at least one connecting rod is provided between the first legs and/or the second legs.

For easy insertion, the plug of the gridiron has a shape of the frustum of a cone.

BRIEF DESCRIPTION OF THE INVENTION

BEST MODE OF CARRYING OUT THE INVENTION

The present invention will be further described in combination with the drawings.

Figure 1:
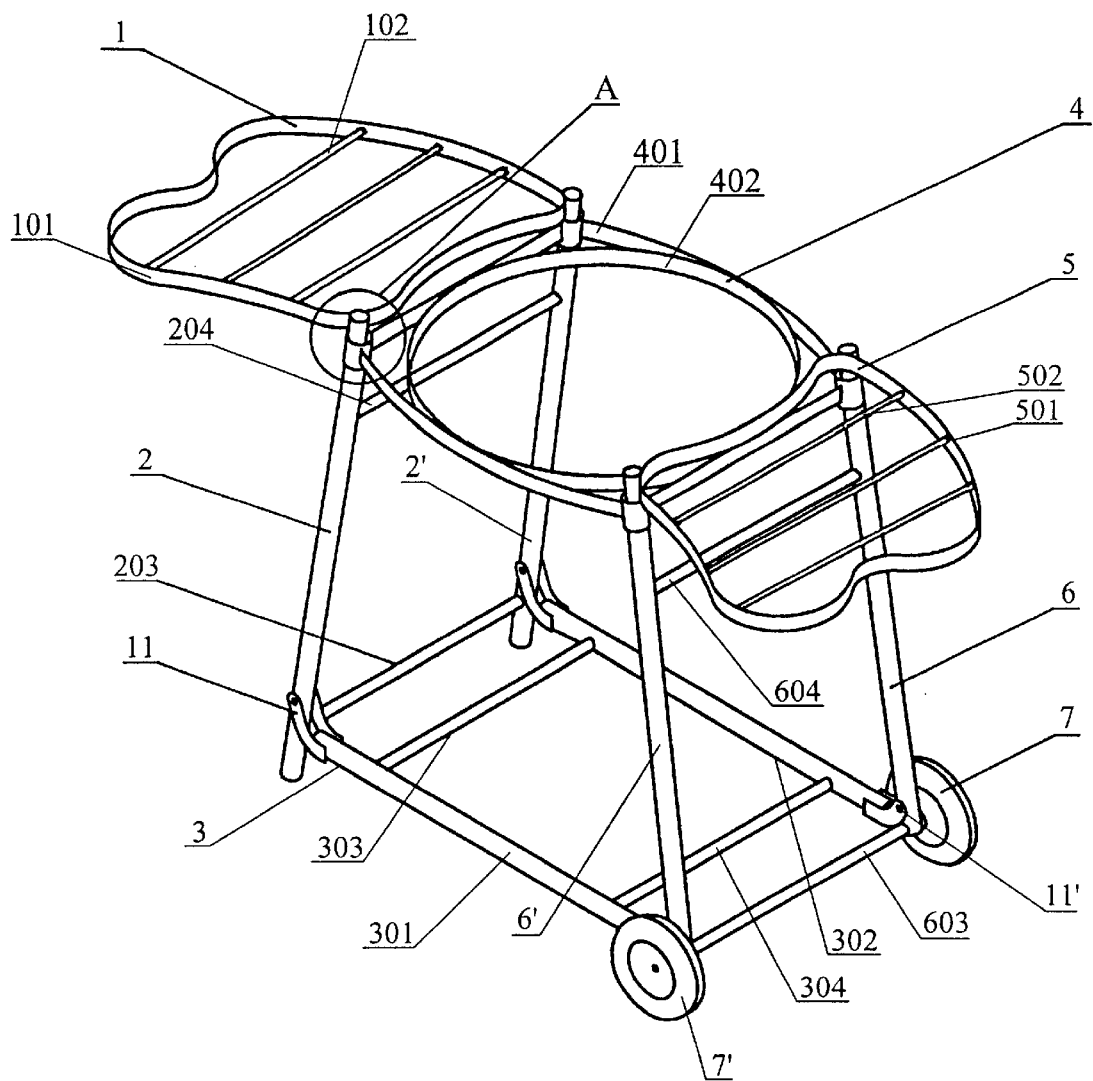
FIG. 1 is a perspective view of one embodiment of the carrier according to the present invention.

Referring to FIG. 1, the carrier includes a bottom frame 3, two first legs 2, 2' and two second legs 6, 6'. The bottom frame 3 has two shafts 301, 302, each being connected to the first leg by a hinge 11, and to the second leg by a hinge 11'. In this embodiment, the bottom frame 3 includes two connecting rods 304, 304 perpendicular to the shaft 301. Two wheels 7, 7' are mounted to the bottom of the second legs 6, 6'. A connecting device 4 is mounted to the first and second legs with four sleeve pipes that house the upper ends of the first and second legs. A pair of gridirons 1, 5 are connected to the upper ends of the first and second legs for placing stuffs for roaster.

Figure 2:
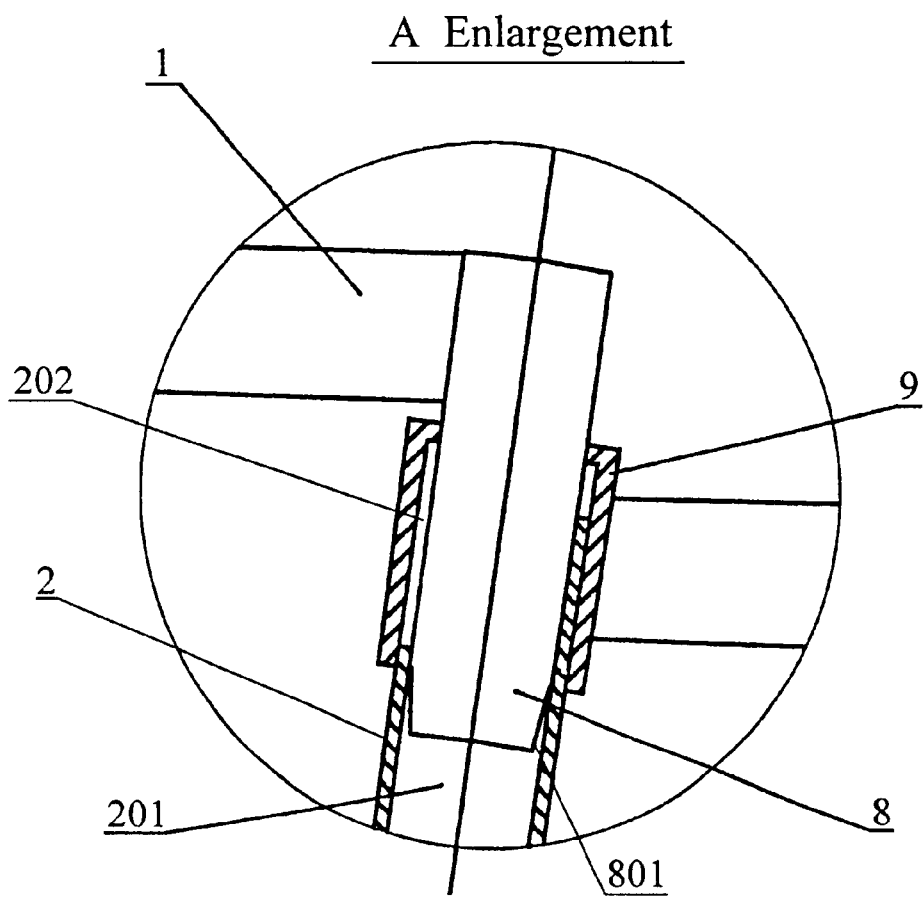
FIG. 2 is an enlarged view of portion A of the carrier shown in FIG. 1.

Referring to FIG. 2, like the second leg, the first leg has a tubular upper end 201, and the gridiron 1 has a plug 8. The plug 8 with the end 801 in the shape of the frustum of a cone is inserted into the tubular upper end 201. In this embodiment, the tubular upper end 201 has a groove 202 extended along its length direction so that the sleeve pipe 9, the tubular end 201 and the plug 8 can be matched fixedly.

The connecting device 4 includes a connecting body 401 to connect the four sleeve pipes and a circular support 402 that matches the roaster oven. The gridirons 1 and 5 have outer frames 101, 501 and a plurality of poles 102, 502 connected to the outer frames for placing stuff for roaster.

Two connecting rods 203, 204 are provided between the first legs, and two connecting rods 603 and 604 are provided between the second legs to make sure the carrier steadier.

The carrier of the invention can be easily assembled and disassembled. The first and second legs can be folded together with the bottom frame to form a compact set for easy transportation and deposition. When assembled, the folded first and second legs are unfolded, and then the connecting device is mounted to the upper ends of the first and second legs, the plugs of the gridirons are inserted into the sleeve pipes of the connecting device. The wheels are finally set to the carrier if necessary. It only takes from 20 to 30 seconds to assemble the carrier of the invention.

The carrier of the invention with a structure of a hinged connection between the legs and the bottom frame, and the sleeve pipes provided at the upper end of the first and second legs makes it steadier and easily assembled.

Although the present invention has been described in terms of certain preferred embodiments, other embodiments will be apparent to those skilled in the art. The invention is, therefore, not limited to the particular embodiments described, but is capable of modification or variation without departing from the spirit of the invention, the full scope of which is defined by the appended claims.

What is claimed is:

1. A carrier for a roaster oven comprising a bottom frame (3) including two shafts (301, 302); two first legs (2, 2') each having a tubular upper end, connected to one end of the shafts;

two seconds legs (6, 6') each having a tubular upper end, connected to another end of the shafts;

a connecting device (4) for supporting the roaster oven, having four sleeve pipes housing the upper end of the first and second legs; and two gridirons (1,5) each including two plugs inserted into the sleeve pipes and wherein the first legs and the second legs are hinged to the bottom frame so that the first legs and the second legs can be folded with the bottom frame.

2. A carrier according to claim 1, wherein the upper end of both the first legs and the second legs has a groove (202) extended along its length direction.

3. A carrier according to claim 2, wherein the first legs and the second legs are hinged to the bottom frame so that the first legs and the second legs can be folded with the bottom frame.

4. A carrier according to claim 3 further comprising a plurality of wheels provided at an end portion of at least one of the first legs and the second legs.

5. A carrier according to claim 4, wherein the connecting device includes a circular support (402) for supporting the roaster oven.

6. A carrier according to claim 5, wherein each of the gridirons includes an outer frame and a plurality of poles connected to the outer frame.

7. A carrier according to claim 5, wherein the bottom frame includes at least one connecting rods (303, 304) perpendicular to the shafts.

8. A carrier according to claim 7, wherein at least one connecting rod is provided between the first legs, or between the second legs.

9. A carrier according to claim 8, wherein the plug has a shape of the frustum of a cone.

10. A carrier according to claim 2 further comprising a plurality of wheels provided at an end portion of at least one of the first legs and the second legs.

11. A carrier according to claim 2, wherein the connecting device includes a circular support (402) for supporting the roaster oven.

12. A carrier according to claim 3, wherein each of the gridirons includes an outer frame and a plurality of poles connected to the outer frame.

13. A carrier according to claim 1 further comprising a plurality of wheels provided at an end portion of at least one of the first legs and the second legs.

14. A carrier according to claim 1, wherein the connecting device includes a circular support (402) for supporting the roaster oven.

* * * * *